United States Patent
Aoki

[19]
[11] Patent Number: 5,956,299
[45] Date of Patent: Sep. 21, 1999

[54] METHOD AND APPARATUS FOR READING OUT DATA FROM A RECORDING MEDIUM

[75] Inventor: Nobuyuki Aoki, Kanagawa, Japan

[73] Assignee: Sony Corporation, Tokyo, Japan

[21] Appl. No.: 08/956,979

[22] Filed: Oct. 23, 1997

[30] Foreign Application Priority Data

Oct. 29, 1996 [JP] Japan .................................. 8-286386

[51] Int. Cl.⁶ ............................................... G11B 17/22
[52] U.S. Cl. ........................................ 369/32; 369/44.28
[58] Field of Search .................................. 369/32, 44.28, 369/44.27, 44.29, 44.34, 44.35, 44.36

[56] References Cited

U.S. PATENT DOCUMENTS

| | | | |
|---|---|---|---|
| 4,866,687 | 9/1989 | Kasai | 369/32 |
| 4,918,676 | 4/1990 | Miyasaka | 369/32 |
| 5,088,075 | 2/1992 | Yokota | 369/32 |
| 5,216,647 | 6/1993 | Kitani | 369/44.28 |
| 5,222,054 | 6/1993 | Muraoka et al. | 369/32 |
| 5,339,299 | 8/1994 | Kagami et al. | 369/32 |
| 5,623,460 | 4/1997 | Nagasawa et al. | 369/32 |
| 5,623,464 | 4/1997 | Tani | 369/32 |
| 5,802,019 | 9/1998 | Yamada | 369/32 |
| 5,808,982 | 9/1998 | Yun | 369/32 |

*Primary Examiner*—Tan Dinh
*Attorney, Agent, or Firm*—Frommer Lawrence & Haug, LLP.; William S. Frommer

[57] ABSTRACT

A playback apparatus prevents the position of a pick-up from deviating to a location outside a data area of a record medium. A system controller judges whether the number of tracks T to be skipped between the current read position and a target sector of a track jump is equal to or greater than a predetermined number. If the number of tracks is equal to or greater than 1,000, for example, the system controller then judges whether a track including the target sector is located within a predetermined range A from the edge of a data area on the medium which corresponds to an error that may result in the track jump. If the track including the target sector is located within the predetermined range from the edge of the data area, the system controller subtracts A from the number of tracks T to be skipped in the track jump resulting in a new number of tracks T–A. The track jump is executed by skipping (T–A) tracks while the tracking and thread servos are halted.

11 Claims, 4 Drawing Sheets

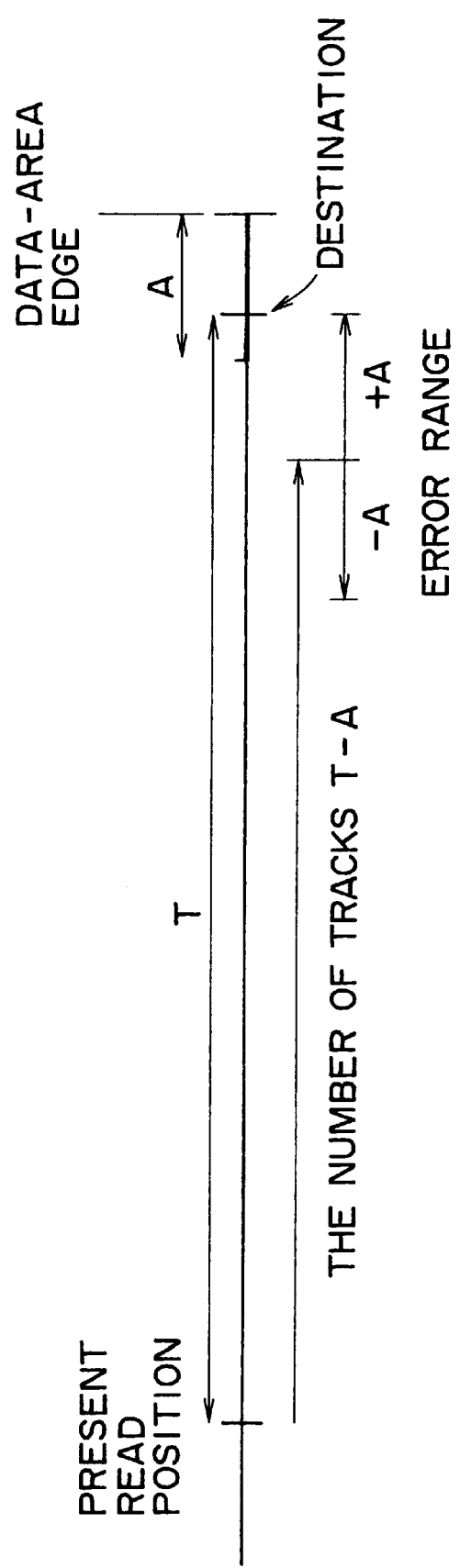

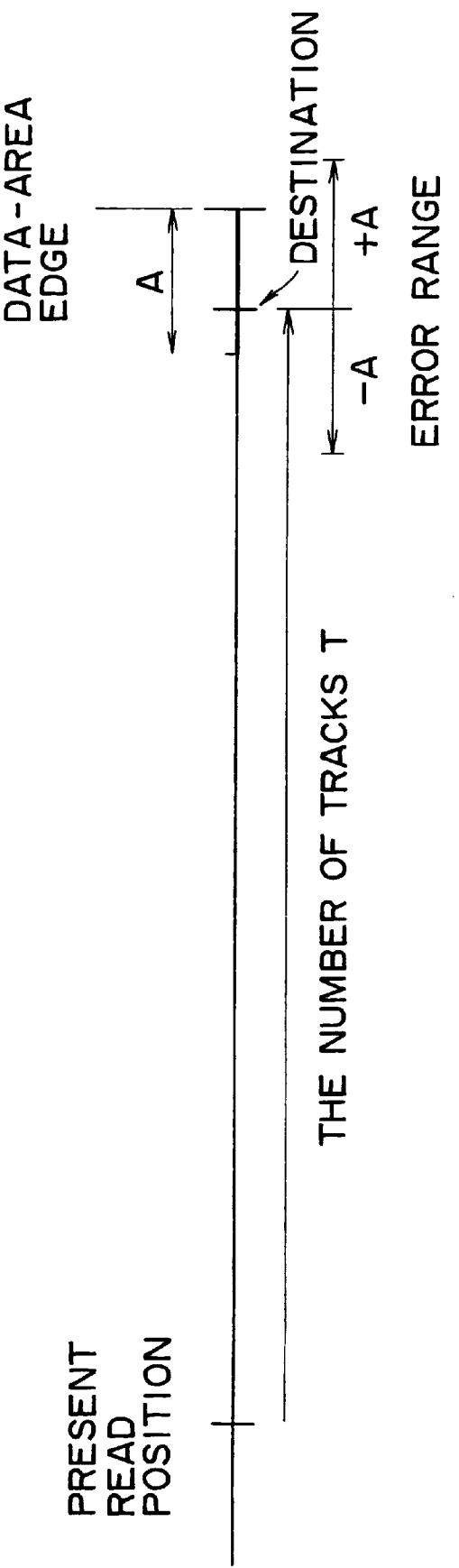

METHOD AND APPARATUS FOR READING OUT DATA FROM A RECORDING MEDIUM

BACKGROUND OF THE INVENTION

1. Field of the Invention

In general, the present invention relates to a playback apparatus and a playback method. In particular, the present invention relates to a playback apparatus and a playback method wherein, in the case of a movement of an optical pickup with servo control of a driving unit thereof put in a halted state or in the case of a movement of the optical pickup from a read position to another over a long distance, if the track to be read next is within a predetermined distance from an edge of an area for recording data, the distance of movement of the optical pickup from the present read position to the destination of the movement is set at a value shorter than the actual distance from the current read position to the track to be read next.

2. Description of the Related Art

At the present time, an optical disk such as a compact disk for recording digital data is becoming popular. In the case of such an optical disk, data is recorded on tracks formed in the circumferential direction of the disk.

In an operation to play back data recorded on an optical disk, an optical pickup is used for radiating a laser beam to pits which are formed on each track of the optical disk to form a shape representing data recorded on the track. A light reflected by the pits is then converted into an electrical signal representing the data.

Driven by typically a thread motor, the optical pickup moves in a direction perpendicular to the tangential direction of the tracks of the optical disk, that is, in the radial direction of the disk. Thus, in an operation to read out data recorded in a noncontiguous region, a control circuit for controlling the thread motor computes the number of tracks to skip in order to go to the next track having a sector to be read next from a sector address representing the present read position and the address of the sector to be read next. The optical pickup is then driven to move (or driven to make a track jump) over as many tracks as computed by the control circuit.

In order to complete a change from the present read position to a next one in a short period of time in a movement of the optical pickup over a long distance, for example, the playback apparatus moves the pickup by putting the tracking servo in a halted state.

If a track jump is made by putting the tracking servo in a halted state as described above, however, it is quite within the bounds of possibility that an error is generated in the movement distance of the optical pickup. That is to say, the optical pickup may be moved in a track jump to a next position separated away from the movement destination by an error A of the track jump. Normally, the distance T from the present position of the optical disk to the destination of a track jump is expressed in terms of tracks, where T is the number of tracks representing the distance from the present position to the destination. In the case of a track jump toward the circumference of a data area, the error A may have such a large value that the destination is located within a distance to the edge of the data area which is shorter than the error A as shown in FIG. 4. In such case, it is quite within the bounds of possibility that the optical pickup is moved to a location outside the data area, giving rise to a problem that it is hard to reproduce data from the optical disk due to a difficulty to carry out servo control.

SUMMARY OF THE INVENTION

Addressing the problem described above, it is thus an object of the present invention to provide a playback apparatus and a playback method wherein, for a track to be read next or a movement-destination track located within a predetermined distance from an edge of a data area, that is, a region for recording data on an optical disk, the distance of movement of an optical pickup from the present read position to the destination of the movement is set at a value shorter than the actual distance from the current read position to the track to be read next.

According to a first aspect of the present invention, there is provided a playback apparatus wherein, if a track to be read next is located at an actual distance equal to or longer than a reference corresponding to a predetermined number of tracks from a present read position and the track to be read next is located within a predetermined range from an edge of an area on an recording medium for recording data, a setting means sets a movement distance by which a reading means is to be moved from the present read position at a value shorter than the actual distance from the present read position to the track to be read next.

According to another aspect of the present invention, there is provided a playback method whereby, if a track to be read next is located at an actual distance equal to or longer than a reference corresponding to a predetermined number of tracks from a present read position and the track to be read next is located within a predetermined range from an edge of an area on an recording medium for recording data, a movement distance by which a reading means is to be moved from the present read position is set at a value shorter than the actual distance from the present read position to the track to be read next.

According to still another aspect of the present invention, there is provided a playback apparatus wherein a second control means sets a movement distance by which a reading means is to be moved from a present read position by controlling a driving means with (tracking-)servo control by a first control means put in a halted state (by said second control means) at a value shorter than an actual distance from said present read position to a track to be read next if said track to be read next is located within a predetermined range from an edge of an area on a recording medium for recording data.

According to a still further aspect of the present invention, there is provided a playback method whereby, if a track to be read next after moving a reading unit with servo control of a driving unit for driving the reading unit put in a halted state is located within a predetermined range from an edge of an area on the recording medium for recording data, a movement distance by which the reading unit is to be moved from a present read position is set at a value shorter than an actual distance from the present read position to the track to be read next.

In the playback apparatus according to the first aspect of the present invention, if a track to be read next is located at an actual distance equal to or longer than a reference corresponding to a predetermined number of tracks from a present read position and the track to be read next is located within a predetermined range from an edge of an area on an recording medium for recording data, a setting means sets a movement distance by which a reading means is to be moved from the present read position at a value shorter than the actual distance from the present read position to the track to be read next.

With the playback method according to another aspect of the present invention, if a track to be read next is located at an actual distance equal to or longer than a reference corresponding to a predetermined number of tracks from a present read position and the track to be read next is located within a predetermined range from an edge of an area on an recording medium for recording data, a movement distance by which a reading means is to be moved from the present read position is set at a value shorter than the actual distance from the present read position to the track to be read next.

In the playback apparatus according to still another aspect of the present invention, a second control means sets a movement distance by which a reading means is to be moved from a present read position by controlling a driving means with (tracking-)servo control by a first control means put in a halted state (by said second control means) at a value shorter than an actual distance from said present read position to a track to be read next if said track to be read next is located within a predetermined range from an edge of an area on a recording medium for recording data.

With the playback method according to the still further aspect of the present invention, if a track to be read next after moving a reading unit with servo control of a driving unit for driving the reading unit put in a halted state is located within a predetermined range from an edge of an area on the recording medium for recording data, a movement distance by which the reading unit is to be moved from a present read position is set at a value shorter than an actual distance from the present read position to the track to be read next.

BRIEF DESCRIPTION OF THE DRAWINGS

FIG. 3 is a diagram showing an example of a movement of an optical pickup from a present position to read out data in the playback apparatus shown in FIG. 1; and FIG. 4 is a diagram showing another example of a movement of an optical pickup from a present position to read out data.

DETAILED DESCRIPTION OF THE PREFERRED EMBODIMENT

The present invention will become more apparent from a study of the following detailed description of a preferred embodiment with reference to accompanying diagrams.

Figure 1:
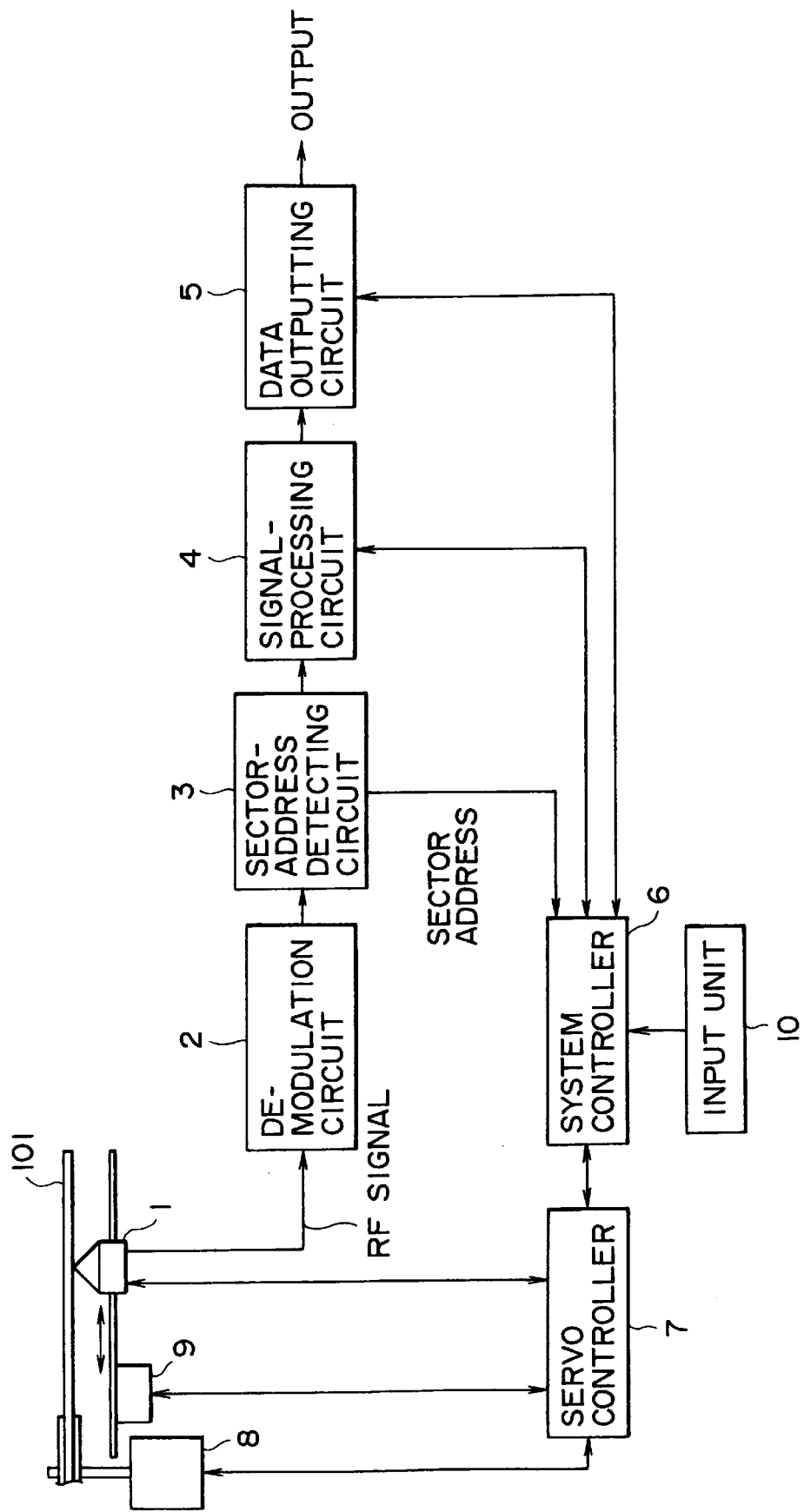
FIG. 1 is a block diagram showing a typical configuration of an embodiment implementing a playback apparatus provided by the present invention.

FIG. 1 is a diagram showing a typical configuration of an embodiment implementing a playback apparatus provided by the present invention. As shown in the figure, in accordance with a control signal supplied from a servo controller (a first control means and a third control means) 7, an optical pickup (a reading means) 1 radiates a laser beam to a predetermined track of an optical disk 101 while adjusting the distance from an embedded lens not shown in the figure to the optical disk 101 and converts a light reflected by the track into an electrical RF signal, outputting the RF signal to a demodulation circuit 2.

The demodulation circuit 2 converts the RF signal supplied thereto by the optical pickup 1 into binary data and then, after carrying out error correction, outputs resulting digital data to a sector-address detecting circuit 3.

The sector-address detecting circuit 3 extracts the address of a sector, in which the digital data is recorded, from the digital data supplied thereto. In other words, the sector-address detecting circuit 3 extracts the address Sc of a sector from which the present data was read out by the optical pickup 1. Then, the address Sc of the sector is output to a system controller 6 (a control means or a second control means) while the digital data supplied thereto is passed to a signal processing circuit 4.

The signal processing circuit 4 carries out predetermined processing such as decompression of compressed data on the digital data supplied thereto, outputting processed data to a data outputting circuit 5.

In the case of multiplexed data stored in the optical disk 101, the signal processing circuit 4 selects particular information from the multiplexed data in accordance with predetermined setting and outputs the address (the sector address) of the selected information to the system controller 6.

Controlled by the system controller 6, the data outputting circuit 5 forwards the data supplied thereto by the signal processing circuit 4 to a predetermined circuit which is not shown in the figure.

In accordance with the sector address Sc supplied from the sector-address detecting circuit 3 and a signal set by the user via an input unit 10, the system controller 6 drives the servo controller 7 to control a driving system comprising, among other components, a spindle motor 8 and a thread motor (a driving means) 9.

To put it in detail, the servo controller 7 controls the spindle motor 8 to rotate the optical disk 101 so that the optical pickup 1 slides over read positions along a track at a predetermined speed. The servo controller 7 also controls the thread motor 9 so that the optical pickup 1 is located at a read position specified by the system controller 6.

In addition, the servo controller 7 also controls an actuator of the optical pickup 1 not shown in the figure to carry out a tracking servo.

Figure 2:
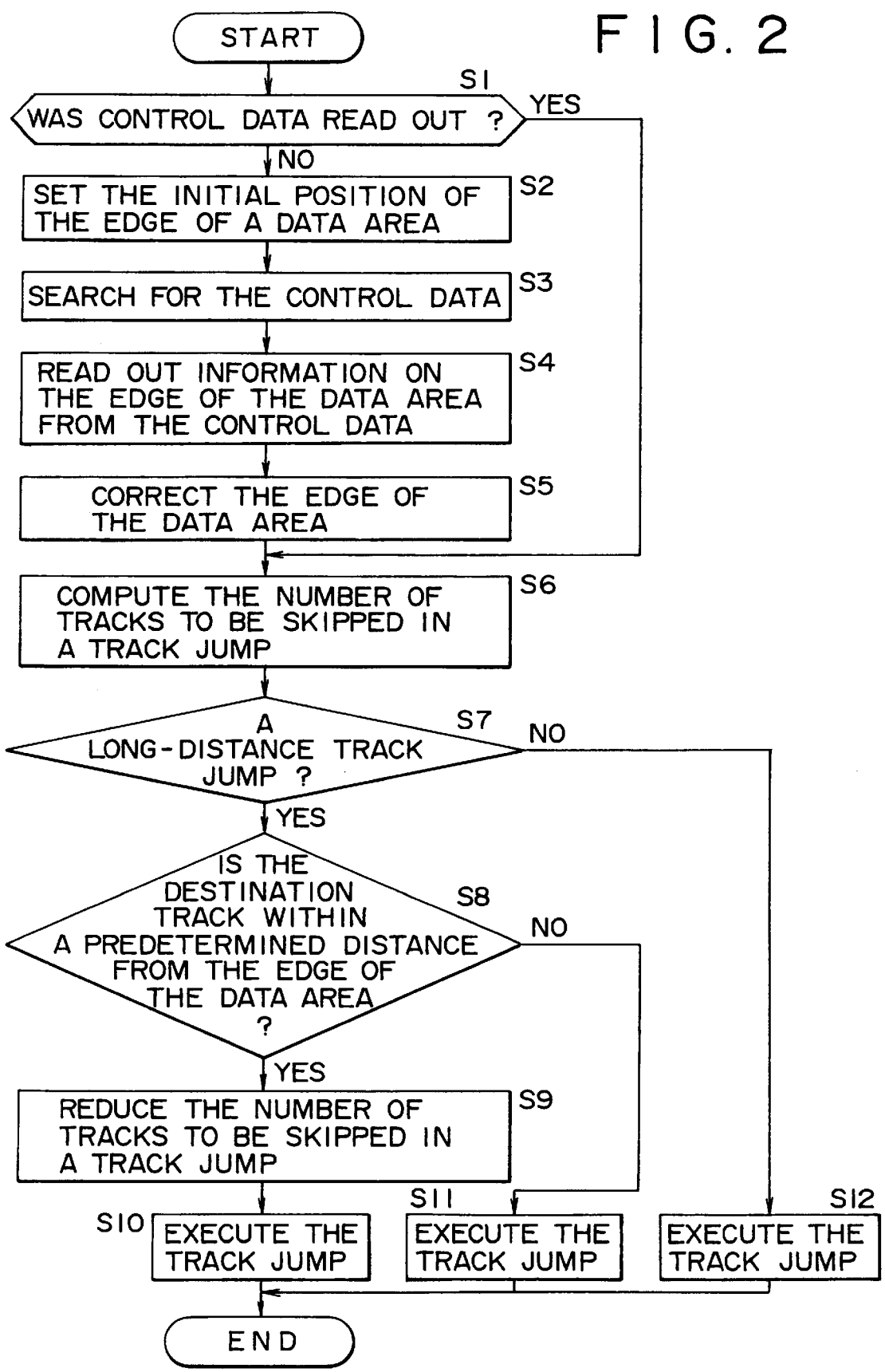
FIG. 2 is a flowchart representing operations carried out by the playback apparatus shown in FIG. 1 in order to move an optical pickup from a present position to read out data from an optical disk.

The following is description of operations carried out by the playback apparatus shown in FIG. 1 in order to change the read position of the optical pickup 1 by referring to a flowchart shown in FIG. 2.

As shown in FIG. 2, the flowchart begins with a step S1 at which the system controller 6 forms a judgment as to whether or not control data recorded on the optical disk 101 has already been read out from the optical disk 101. The control data is information including the length of data recorded on the optical disk 101. If the control data has not been read out, the flow goes on to a step S2 to set the position of the edge of the data area at a value prescribed by specifications of the optical disk 101.

In the case of a DVD (Digital Versatile Disc), for example, tracks are formed on the disc up to a circumference with a radius of 35 mm as prescribed by the specifications thereof. Thus, the initial circumference on the edge of the data area on the outer circumferential side is set at a circumference having a radius of 35 mm.

Then, the flow proceeds to a step S3 at which the system controller 6 moves the read position of the optical pickup 1 to a position at which the control data is recorded. The read position which is prescribed in advance in the specifications is typically the innermost circumference. Subsequently, the flow continues to a step S4 at which the correct information on the position (of the edge of the data area) is reproduced. The reproduced control data is supplied through the signal processing circuit 4 (to the system controller 6).

It should be noted that, in case the system controller 6 makes a track jump over a long distance at the step S3, the tracking and thread servos are not carried out. Thus, the number of tracks to be skipped in order to move toward a position on the edge of the data area set at the step S2 is adjusted as will be described later so that the read position of the optical pickup 1 is not changed to a location outside the data area. It should be noted that, in the case of a track jump over as many tracks as a predetermined number or fewer, on the other hand, the system controller 6 accomplishes the track jump while carrying out various kinds of servo control. In this case, the number of tracks to be skipped is not adjusted.

The flow then goes on to a step S5 at which the system controller 6 finds the position of the edge of the data area on the optical disk 101, from which data is being reproduced currently, from the control data supplied thereto and uses the found position as a corrected position of the edge of the data area, storing the corrected position.

If the outcome of the judgment formed by the system controller 6 at the step S1 indicates that control data has been read out, on the other hand, the position of the edge of the data area on the optical disk 101 is considered to have already been corrected. In this case, the steps S2 to S5 are skipped.

Then, the flow proceeds to a step S6 at which the system controller 6 finds the number of tracks T over which the read position of the optical pickup 1, is to be changed. T is found from the sector address Sc of the current read position supplied by the sector-address detecting circuit 3 and the target sector address St.

Subsequently, the flow continues to a step S7 at which the system controller 6 forms a judgment as to whether or not the number of tracks T is equal to or greater than 1,000. If T is found equal to or greater than 1,000, the flow goes on to a step S8.

At the step S8, the system controller 6 forms a judgment as to whether or not the track including a target sector, that is, the destination track, is located within a predetermined range A from the edge of the data area as shown in FIG. 3. The range A is equal to an error that may result in a track jump. If the destination track is found located within the predetermined range A from the edge of the data area, the flow continues to a step S9 at which the number of tracks to be skipped in the track jump is corrected by subtracting the number of tracks corresponding to the range A from T found at the step S6 to provide a new track count of (T−A).

The flow then proceeds to a step S10 at which the system controller 6 drives the thread motor 9 to execute the track jump based on the new number of tracks (T−A to be skipped by putting the tracking and thread servos in a halted state.

If the destination track including the target sector is found located outside the predetermined range A from the edge of the data area at the step S8, on the other hand, the flow proceeds to a step 11 at which the system controller 6 drives the thread motor 9 to execute the track jump based on the original number of tracks T found at the step S6 by putting the tracking and thread servos in a halted state. In addition, if the number of tracks T is found smaller than 1,000 at the step S7, on the other hand, the flow goes on to a step S12 at which the system controller 6 drives the thread motor 9 to execute the track jump based on the original number of tracks T found at the step S6 by implementing the tracking and thread servos.

As described above, if the track including a target sector, that is, the destination track, is located within a predetermined range A from the edge of the data area where the range A is equal to an error that may result in such a track jump, the number of tracks to be skipped in the track jump is reduced before making the track jump.

It should be noted that, in the case of a range of tracks on a DVD each with an equal number of sectors per track, the number of tracks in the range is about 1,000. For this reason, a skipped-track count of 1,000 is used as a threshold value at the step S7. In the case of an optical disk 101 of another kind, on the other hand, the threshold may be set at another value appropriate for the disk.

What is claimed is:

1. A playback apparatus comprising:
   reading means for reading out data from a predetermined track on a recording medium;
   judging means for judging whether a track to be read out next is located at an actual distance equal to or longer than a reference distance corresponding to a predetermined number of tracks from a present read position of said reading means and whether said track to be read next is located within a predetermined range from an edge of an area on said recording medium for recording data;
   setting means for setting a movement distance by which said reading means is to be moved from said present read position for a distance shorter than said actual distance from said present read position to said track to be read next in dependence on said judgment by said judging means; and
   control means for controlling movement of said reading means from said present read position by said movement distance set by said setting means.

2. A playback apparatus according to claim 1, wherein said setting mean uses an initial value set in accordance with a format of said recording means until such time that information at a position of said edge of said area on said recording medium is read out from said recording medium.

3. A playback apparatus according to claim 1, wherein said predetermined number of tracks corresponding to said reference distance is a number of tracks each having an equal number of sectors per track on said recording medium.

4. A playback apparatus according to claim 1, wherein said setting means sets a movement distance by which said reading means is to be moved from said present read position by subtracting a difference distance corresponding to said predetermined range from said actual distance.

5. A playback apparatus according to claim 1, wherein said predetermined range is set at a value corresponding to a movement-distance error which results in a movement of said reading means from said present read position with servo control of a driving system for moving said reading means put in a halted state.

6. A playback method comprising the steps of:
   reading out data from a predetermined track on a recording medium by using a reading means;
   judging whether a track to be read next is located at an actual distance equal to or longer than a reference distance corresponding to a predetermined number of tracks from a present read position of said reading means and whether said track to be read next is located within a predetermined range from an edge of an area on said recording medium for recording data;
   setting a movement distance by which said reading means is to be moved from said present read position for a distance shorter than said actual distance from said present read position to said track to be read next in dependence on said judgment at said jumping step; and
   moving said reading means from said present read position by said movement distance set at said setting step.

7. A playback apparatus comprising:

reading means for reading out data from a predetermined track on a recording medium;

first control means for controlling a tracking servo for tracking said reading means to said predetermined track;

second control means for controlling a driving means and said first control means;

setting means for setting a movement distance by which said reading means is to be moved from a present read position; said driving means, responsive to said setting means and to a halting of the tracking servo to drive said reading means a distance shorter than an actual distance from said present read position to a track to be read next when said track to be read next is located within a predetermined range from an edge of an area on said recording medium for recording data; and said driving means driving said reading means from said present read position by said movement distance set by said setting means.

8. A playback apparatus according to claim 7, further comprising third control means for controlling a thread servo of said driving means; wherein said setting means further includes sub-means for setting said movement distance by which said reading means is to be moved from said present read position by controlling said driving means to drive said reading means, with the servo control by said first control means and with a halting of said third control means, a distance shorter than said actual distance from said present read position to a track to be read next when said track to be read next is located within said predetermined range from said edge of an area on said recording medium.

9. A playback apparatus according to claim 7, wherein said predetermined range is set at a value corresponding to an error of said movement distance which results when said driving means is driven to move said reading means from said present read position with said servo control halted.

10. A playback apparatus according to claim 7, wherein said second control means sets said movement distance to move said reading means from said present read position at a distance shorter than said actual distance from said present read position to a track to be read next by a difference distance corresponding to said predetermined range.

11. A playback method comprising the steps of:

reading out data from a predetermined track on a recording medium by means of a reading unit;

judging whether a track to be read next after moving said reading unit, with servo control of a driving unit which drives said reading unit halted, is located within a predetermined range from an edge of an area on said recording medium for recording data;

setting a movement distance by which said reading unit is to be moved from a present read position at a distance shorter than an actual distance from said present read position to said track to be read next; and driving said reading unit from said present read position by said movement distance set at said setting step.

* * * * *